May 2, 1967 C. A. GONGWER 3,316,936
RESILIENT VALVE MEMBER HAVING A PLURALITY OF PASSAGES
Filed Jan. 27, 1964 3 Sheets-Sheet 1

INVENTOR.
CALVIN A. GONGWER
BY Edward O. Ansell
William E. Hiller
ATTORNEY

May 2, 1967   C. A. GONGWER   3,316,936
RESILIENT VALVE MEMBER HAVING A PLURALITY OF PASSAGES
Filed Jan. 27, 1964   3 Sheets-Sheet 2

INVENTOR.
CALVIN A. GONGWER
BY Edward O. Ansell
William E. Hiller
ATTORNEY

2

United States Patent Office 3,316,936
Patented May 2, 1967

3,316,936
RESILIENT VALVE MEMBER HAVING A PLURALITY OF PASSAGES
Calvin A. Gongwer, Glendora, Calif., assignor to Aerojet-General Corporation, Azusa, Calif., a corporation of Ohio
Filed Jan. 27, 1964, Ser. No. 340,452
14 Claims. (Cl. 137—625.28)

This application is a continuation-in-part of my application Ser. No. 104,198, filed Apr. 17, 1961, now abandoned, which itself is a continuation-in-part of my application Ser. No. 652,938, filed Apr. 15, 1957, now abandoned.

The present invention relates broadly to valves controlling the flow of liquids and gases and specifically to a valve which may be operated relatively noiselessly and free from vibration and cavitation (in the case of liquids) from a fully open to a fully closed position.

In many valve installations, a valve, in gradually closing off the flow of water along a fluid-conducting passageway, will very commonly emit a rushing sound as a large volume of water is admitted under considerable pressure through the valve into a receptacle downstream of the valve. As the flow of water is throttled by the gradual closing of the valve, the valve may cause high frequency noise, due mainly to cavitation resulting from the high speed passage of water over the valve seat, with vibration occurring and being transmitted to nearby objects which in turn may transmit such vibration considerable distances from the valve.

Various means have been suggested to make valves relatively noiseless, but without much success, such as by breaking up the flow of water by positioning a disc of fine mesh wire or a pad of fibrous material in the fluid-conducting passageway, but such constructions do not remove the cause of the cavitation giving rise to noise.

It is an object of the present invention to provide an improved valve which is so constructed that little or no vibration occurs in the fluid flow, such as a water or gas stream, and therefore no noise is noticeable.

It is another object of the present invention to provide an improved valve construction which is especially adapted for use as a fluid flow regulator, such as where water is to be supplied at low or moderate pressure, for instance, to an irrigation system, from a conduit carrying a large volume of water at comparatively high pressures, the valve being effective in dissipating the energy of the high pressure water stream so that a small and compact mechanism for controlling liquid flow may be provided.

With the above stated and other objects in view, the invention comprises a valve incorporating a housing containing a valve member in the form of a resilient mass having a multiplicity of passages or openings therethrough arranged in the path of flow of the fluid through the valve. Means are provided whereby pressure may be applied to the resilient mass to reduce the area of the openings or close them completely and thus control the flow of fluid from full flow to complete shut-off of flow, the resilience of the mass being effective to permit the deformation thereof to vary the resistance to flow.

Still further objects of the invention will hereinafter appear from the following specification and accompanying illustrative drawings.

Figure 8A:
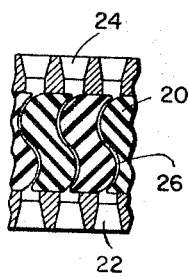
FIGURE 8a is a fragmentary longitudinal sectional view, similar to FIGURE 6a, but showing the valve of FIGURE 1 near shut-off or closed position.
Figure 8B:
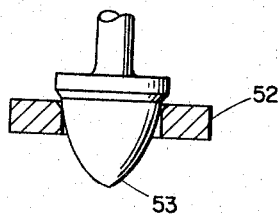
FIGURE 8b is a fragmentary longitudinal sectional view, similiar to FIGURE 6b, but showing the conventional valve of FIGURE 6b near shut-off or closed position.
Figure 7A:
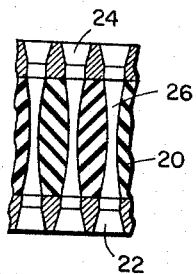
FIGURE 7a is a fragmentary longitudinal sectional view, similar to FIGURE 6a, but showing the valve of FIGURE 1 in its half-open position.
Figure 7B:
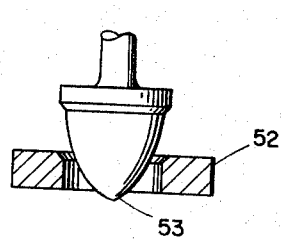
FIGURE 7b is a fragmentary longitudinal sectional view, similar to FIGURE 6b, but showing the conventional valve of FIGURE 6b in its half-open position.
Figure 6A:
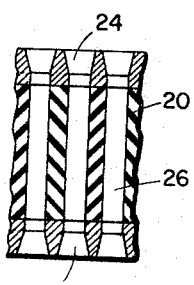
FIGURE 6a is a fragmentary longitudinal sectional view of the flow-controlling components of the valve shown in FIGURE 1 when the valve is in the fully open position.
Figure 6B:
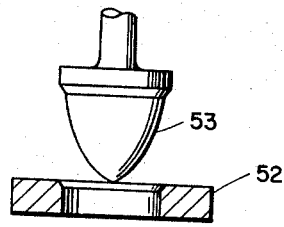
FIGURE 6b is a fragmentary longitudinal sectional view of a conventional valve in its fully open position.
Figure 9:
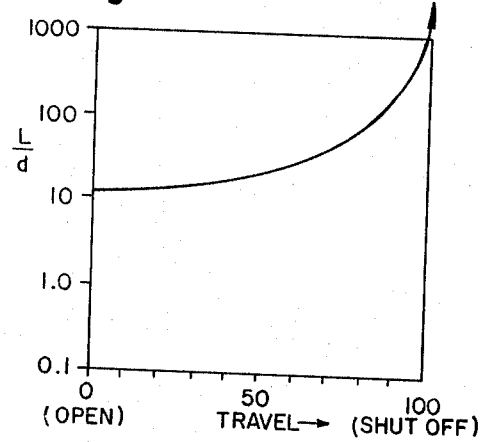
Figure 10:
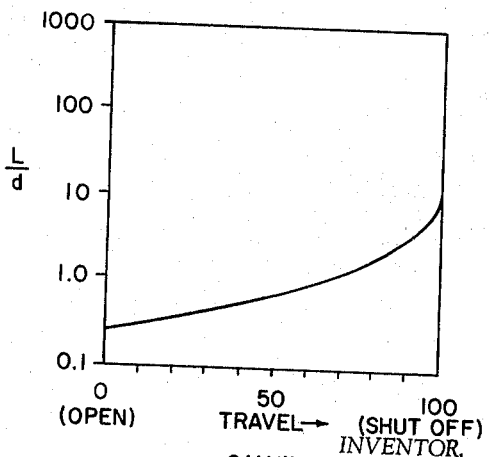

FIGURE 9 is a graph showing the relation between the degree or percent to which the valve of FIGURES 6a, 7a and 8a is open and the ratio of length of passage to diameter of passage ($L/d$) in the valve member of the valve as shown in FIGURES 6a, 7a and 8a; and FIGURE 10 is a graph showing the relation between the degree or percent to which the conventional valve of FIGURES 6b, 7b and 8b is open and the ratio of $L/d$ in the conventional valve of FIGURES 6b, 7b and 8b.

Figure 1:
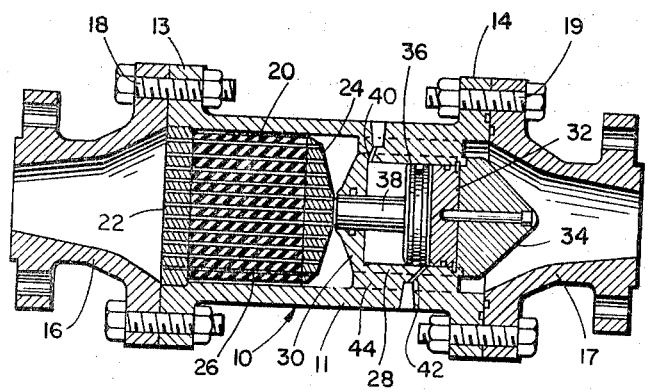
FIGURE 1 is a longitudinal sectional view of a valve constructed in accordance with the present invention.

Referring more specifically to the drawings and in particular to FIGURE 1, a valve constructed in accordance with the present invention is generally indicated at 10. As shown, the valve 10 comprises a cylindrical housing 11 provided with radially outwardly extending annular flanges 13, 14 at its opposite ends. The valve housing 11 is connected into a fluid-conducting passage, such as a pipe, conduit, or the like. In this respect, end adapter members in the form of flanged tubular coupling members 16, 17 may be connected to the flanges 13, 14 at the opposite ends of the housing by suitable fastener means, such as the nut and bolt assembles 18, 19. It will be understood that the tubular coupling members 16, 17 may be respectively secured to the ends of adjacent spaced sections included in an elongated fluid-conducting passage so as to install the valve 10 therein.

The valve 10 further comprises a valve member or valve body 20 of resilient elastomeric material, the resilient valve member 20 being slidably received in the housing 11 and being disposed between a pair of axially spaced, perforated plates 22, 24. The perforated plate 22 forms a valve seat fixedly secured in the housing 11 at the end thereof from which flange 13 extends radially outwardly. The perforated plate or valve seat 22 thereby provides a perforated end closure at one end of the housing 11.

The perforated plate 24 forms a gland member which is slidably received within the housing 11 and is adapted to apply an axially directed deforming force against the resilient valve member 20 for a purpose to be subsequently described. The resilient valve member 20 in its unstressed or fully open position is spaced radially inwardly from the internal cylindrical surface of the housing 11. The resilient valve member 20 comprises a cylindrical body having a multiplicity of elongate passages 26 extending therethrough substantially parallel to the longitudinal axis of the body to provide fluid-flow openings through the resilient valve member 20. The perforations in the valve seat 22 and the gland member 24 correspond in number with the number of elongate passages 26 through the resilient valve member 20, and the valve seat 22 and the gland member 24 are axially alined with the resilient valve member 20 so that the perforations in the valve seat 22 and the gland member 24 are respectively brought into registration with the elongate passages 26 through the resilient valve member 20 corresponding thereto.

Valve actuator means are provided for axially moving the perforated gland member 24 within the housing 11 to regulate the size of the elongate passages 26 in the resilient valve member 20 by varying the degree of deformation imposed on the resilient valve member 20 by the gland member 24. The valve actuator means may comprise a piston and cylinder assembly as shown in FIGURE 1. In this connection, it will be seen that the housing 11 includes a thickened wall portion adjacent the end thereof from which the flange 14 extends, the thickened wall portion defining an internal pressure cylinder 28. The housing 11 further includes an internal partition or wall 30 located between its opposite ends, the partition 30 forming a closure for one end of the cylinder 28. The other end of the cylinder 28 is closed by a closure plate 32 to which is attached a fluid diverting element 34 to be hereinafter described. A piston 36 is mounted for axial reciprocatory movement within the cylinder 28 under the influence of fluid pressure, the piston 36 having an axially elongated piston rod 38 slidably received through a central bore provided in the partition wall 30 and supported thereby. The piston rod 38 is adapted to bear against the gland member 24. Fluid pressure may be introduced into the cylinder 28 on either side of the piston 36 by appropriate ports 40, 42 to effect axial movement of the piston 36 in either direction, thereby changing the position of the piston rod 38 in the housing 11.

The fluid diverting element 34 comprises a generally conical cap extending outwardly from the closure plate 32 to which it is attached into the interior of the tubular coupling member 17, it being assumed that the flow of fluid will occur from right to left in the valve assembly as shown in FIGURE 1. The apex of the conical fluid diverting element 34 is therefore opposed to the direction of fluid flow, and the diverting element 34 directs the fluid flow radially outwardly where the fluid flow passes through a plurality of longitudinally extending passageways 44 provided in the thickened wall portion of the housing 11 which defines the cylinder 28. The fluid flow is thereby directed into the valve chamber containing the axially movable gland member 24 and the resilient valve member 20 which is held against the valve seat 22.

It will be understood that the valve 10 may be adjusted at any position from fully open to fully closed by appropriately positioning the gland member 24 with respect to the resilient valve member 20 through the valve actuating means so as to obtain the desired degree of opening through the passages 26 in the resilient valve member 20. The flow of fluid after passing through the passageways 44 in the thickened wall portion of the housing 11, passes through the perforations in the gland member 24, the passages 26 in the resilient valve member 20, and the perforations in the valve seat 22, where the flow of fluid leaves the housing 11 and passes into the tubular coupling member 16. The fluid flow through the valve 10 can be readily throttled and controlled by the actuation of the valve actuator means comprising the piston 36 and cylinder 28 assembly. Upon admitting fluid pressure into the cylinder 28 on the right-hand side of piston 36 as viewed in FIGURE 1 through port 42, the piston 36 is forced axially to the left to extend the piston rod 38 outwardly of the cylinder 28, thereby forcing the gland member 24 to the left and deforming the resilient valve member 20 between the valve seat 22 and the gland member 24. As the resilient valve member 20 is deformed, its flow passages 26 are reduced in diameter for throttling the fluid flow therethrough, and at full deformation of the resilient valve member 20, its flow passages 26 are closed to provide complete shut off of the valve 10.

Figure 2:
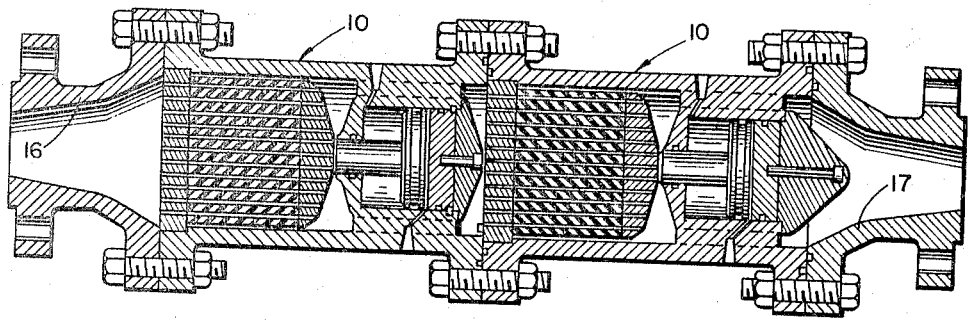
FIGURE 2 is a longitudinal sectional view of two valves of the embodiment shown in FIGURE 1 connected in series.
Figure 3:
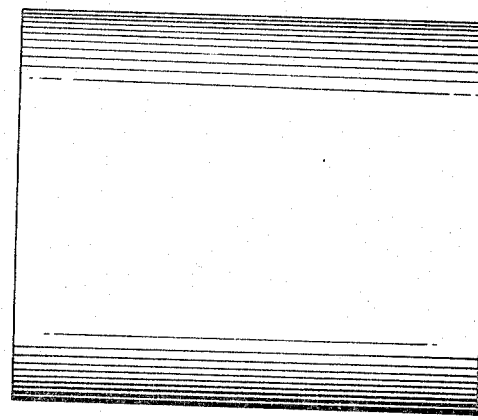
FIGURE 3 is a side elevational view of a resilient element forming a component of the valve shown in FIGURE 1.
Figure 4:
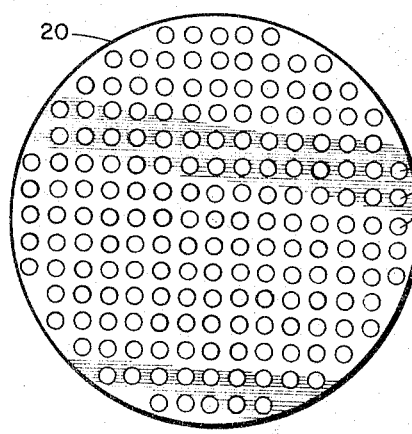
FIGURE 4 is an end elevational view of the resilient element shown in FIGURE 3.

In FIGURE 2, a pair of valves 10, 10 are connected in series to provide for two-stage throttling of the fluid flow through a fluid-conducting passageway, such as a pipe, conduit, etc. In operation, the serially-connected valves 10, 10 individually perform in the same manner as the single valve 10 of FIGURE 1 to provide throttling of fluid flow therethrough, wherein the total pressure drop of the fluid flow extends across both valves 10, 10 and is divided between the two valves 10, 10 so that the pressure drop across any one valve will not exceed the limits of its valve member 20. Thus, the fluid flow is initially throttled by the right-hand valve 10 in FIGURE 2 where a pressure drop occurs across the valve and thereafter the fluid flow is further throttled by the left-hand valve 10 in FIGURE 2 where a further pressure drop occurs as the fluid flows from right to left through the serially-connected valves 10, 10.

The resilient valve member 20 may be made from any suitable elastomeric material, such as silicone rubber which can withstand a temperature of about 400° F. and will not harden or deteriorate at that temperature. Natural rubber or rubber compounds may be used as the material from which the resilient valve member 20 is made, provided the expected operating conditions of the valve are not unduly extreme in such areas as temperature, for example. Other suitable elastomers for the resilient material of the valve member 20 may include the product formed by the polymerization of butadiene alone or with styrene, the interaction between sodium polysulfides and dihalides, the polymerization of chloroprene, the polymerization of isobutylene, and the polymerization and plasticization of vinyl chloride. The elastomeric material of the resilient valve member 20 must be chemically compatible with the fluid to be passed therethrough.

In order to insure registration between the passages 26 in the resilient valve member 20 and the perforations in the valve seat 22 and the gland member 24, the opposite ends of the resilient valve member 20 may be secured to the valve seat 22 and the gland member 24 by suitable means, such as bonding, for example.

Conventional valves generally have an inherent disadvantage in that a large pressure drop of the fluid passing therethrough is occasioned in the narrow region of the valve seat when the valve is being opened or closed. Due to this pressure drop, cavitation occurs at the outlet of the valve. Cavitation, which may be defined as the vaporization of a fluid caused by local pressure reduction, results in the formation of vapor pockets in the interior or on the boundaries of a rapidly moving stream of liquid. The cavity of water vapor is formed and collased in a continuing sequence which causes erosion, vibration, and noise. Cavitation is also encountered in conventional valves while they are being throttled.

Referring again to FIGURE 1, the resilient valve member 20 of the valve 10, which is shown in the fully open position, will have a significantly less pressure drop of fluid per unit length passing therethrough than is occasioned in conventional valves. The pressure drop in the valve 10 of the present invention occurs along the entire length of the resilient valve member 20 and is a function of the ratio of the length of the passages 26 to the diameter of the passages 26 and the flow rate.

There are three principal factors involved in controlling the energy absorbed by the valve, i.e., pressure loss of the fluid, in the operation of the present invention. These factors are the diameter of each passage 26, the length of each passage 26 and the ratio of passage length to passage diameter in the resilient valve member 20. In a given fluid flow system through a fluid-conducting passageway of constant diameter, the pressure loss of the fluid will vary directly as the $L/d$ ratio, where L is the length of the individual passages 26 (also the length of the resilient valve member 20) and $d$ is the diameter of the individual passages 26. When the flow of fluid is shut off by the valve of the present invention, the pressure drop is distributed along the entire length of the resilient valve member 20, and such distribution precludes high velocities of fluid being developed which velocities are responsible for causing cavitation. It appears that the minimum $L/d$ ratio desirable is of the order of about 10 when the valve is in its fully open position. A range of from 10 to 20 in the $L/d$ ratio may be satisfactorily used without causing performance degradation due to cavitation under design operating conditions. The use of a large number, i.e., in the vicinity of from 150 to 250, of passages in the resilient valve member 20 which become progressively smaller in diameter as the number of passages increases, permits the energy associated with large pressure drops to be dissipated smoothly by fluid friction within the passages. With regard to ranges of pressure, the pressure drop across each resilient valve member 20 in a series arrangement of valves, such as illustrated in FIGURE 2, may be as high as about 450 pounds per square inch for each resilient valve member in the series. This maximum permissible pressure drop is determined ultimately by the properties of the elastomer comprising the material of the resilient valve member. The absolute pressures to be handled by each valve are limited only by the strength of the valve and could be of the order of thousands of pounds per square inch.

A particular embodiment of the invention, wherein the resilient valve member was constructed to have an $L/d$ ratio of 12 when the valve is in its fully open position, included a perforated plate having a thickness of 1⅞ inches as the axially movable gland member 24 and a perforated plate having a thickness of 2⅞ inches as the fixed valve seat 22, with the resilient valve member having a length of 6 inches when the valve was disposed in its fully open position. The resilient valve member 20 had an outer diameter of 11½ inches and contained 187 ½-inch diameter passages therethrough. The ratio of cross-sectional area of resilient material of the valve member 20 to the cross-sectional area of the passages 26 was approximately 3:1. The valve had an over-all $L/d$ ratio of 21.5 in its fully open position, since the lengths of the perforations in the valve seat 22 and the gland member 24 may be added to the length L of the passages 26 in the resilient valve member 20 for the fully open position of the valve only. Such a valve permitted a flow of water of 3,000 gallons per minute at a pressure loss of less than 5 lbs./in.² when in its fully open position. The gland member 24 was required to be axially moved a distance of approximately two inches from the fully open position of the valve in a direction increasing the deformation of the resilient valve member 20 before complete shut-off of fluid flow through the valve was accomplished.

Figure 5:
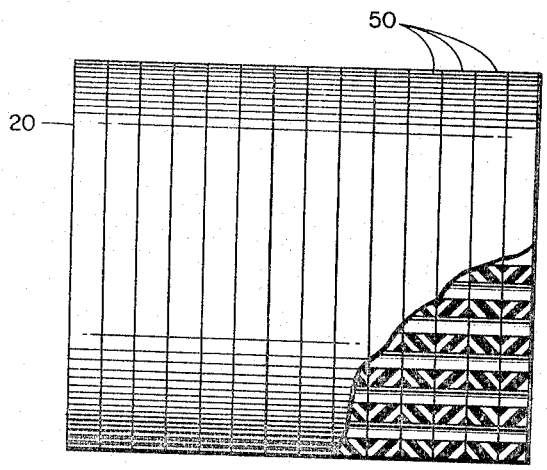
FIGURE 5 is a side elevational view, partially in longitudinal section, of a modified form of the resilient element shown in FIGURE 3.

The hardness of the resilient valve member 20 may be increased progressively beginning with a relatively soft material adjacent the inlet end of the resilient valve member 20 and having a material of progressively increasing hardness approaching the outlet end of the resilient valve member 20. This progressive increase in hardness of the material of the resilient valve member 20 permits the diameter of the passages 26 to be substantially constant throughout the length of the resilient valve member 20 when a fluid is passing therethrough. As the fluid passes through the passages 26, the passages 26 in the resilient valve member 20 have a tendency to be constricted at their downstream ends due to the pressure drop in the fluid. Since it is difficult to vary the hardness of resilient material in a solid mass, the resilient valve member 20 may comprise a plurality of laminated layers or discs 50 of resilient material fixedly attached together and having different degrees of hardness progressively increasing in hardness from the inlet end to the outlet end of the resilient valve member 20, as shown in FIGURE 5.

FIGURES 6a, 7a, and 8a show progressive representative action of the resilient valve member 20 in being deformed from the fully open position of the valve 10 shown in FIGURE 6a to a position in which the valve 10 is nearly closed as shown in FIGURE 8a. FIGURES 6b, 7b, and 8b correspond to FIGURES 6a, 7a, and 8a, respectively, and show the space relation between a valve seat 52 and a valve plug 53 of a conventional valve from its fully open position as shown in FIGURE 6b to a position in which it is nearly closed as shown in FIGURE 8b. The distance through which the gland member 24 in the valve 10 of the present invention must travel (referred to as "length of travel") in deforming the resilient valve member 20 between the fully open position and the closed position of the valve 10 is compared with the "length of travel" of the valve plug 53 of the conventional valve between the fully open position and the closed position of the conventional valve in the graphs shown in FIGURES 9 and 10. In FIGURE 10, it will be observed that the $L/d$ ratio for the single passage of the conventional valve is approximately 10 near shut-off. In contrast, in FIGURE 9, it may be observed that shut-off of the valve 10 of the present invention is achieved at a much higher $L/d$ ratio for the passages 26 in the resilient valve member 20 which indicates that the fluid pressure drop is distributed over a greater length in the valve 10 of the present invention, thereby resulting in shut-off of the valve 10 without cavitation.

Although a particular form of valve actuating means, the piston 36 and cylinder 28 assembly, has been illustrated in the valve 10 as shown in FIGURES 1 and 2, it will be understood that other suitable valve actuating means may be employed to axially move the gland member 24 for increasing and reducing deformation of the resilient valve member 20 within the spirit of the present invention. For example, an inflatable bladder, mechanical levers, or a manually operable handle and screw arrangement may be used as the valve actuating means to effect movement of the gland member 24 for deforming the resilient valve member 20.

Although specific embodiments of the invention have been shown and described, it will be understood, of course, that these embodiments are not to be construed as necessarily restrictive and that various modifications may be made therein without departing from the scope and spirit of this invention, as defined in the appended claims.

I claim:

1. A valve comprising: a substantially cylindrical housing having an inlet and outlet, a substantially cylindrical resilient valve member having a plurality of substantially axially aligned passages therethrough for flow of fluid from the housing inlet to the outlet and slidably received by the housing, a valve seat received within said housing and fixedly attached thereto, said valve seat having a plurality of passages therethrough contiguously formed with the passages through said resilient valve member, a gland member slidably received by said housing and having a plurality of passages therethrough contiguously formed with the passages through said resilient valve member, said resilient valve member being interposed between said valve seat and said gland member, and means for moving said gland member in a direction toward said resilient valve member to deform said resilient valve member for causing a gradual restriction of the passages therethrough over the entire length of such passages which may continue until such passages are completely closed.

2. A valve as defined in claim 1 in which the ratio of the length of the passages through the resilient valve member to the diameter of such passages when wide open varies between 10 and 20.

3. A valve as defined in claim 2 in which the number of passages through the resilient valve member is of the order of from 150 to 250.

4. A valve as defined in claim 1, wherein said resilient valve member comprises an integral mass of elastomeric material.

5. A valve as defined in claim 1, wherein said resilient valve member comprises a plurality of discs stacked together in juxtaposed relation, each of said discs having a plurality of openings therethrough, said said openings through said discs being in respective registration to define said passages through said resilient valve member.

6. A valve comprising: a housing having an inlet and an outlet, a resilient valve member having a plurality of substantially axially aligned passages therethrough for flow of fluid from the inlet to the outlet of the housing, said resilient valve member being of a material which increases in hardness along the direction of fluid flow, said resilient valve member being slidably received by said housing, and means for applying pressure to said resilient valve member in a direction parallel to the passages through said resilient valve member whereby operation of the pressure applying means causes a gradual restriction of the passages over their entire length which may continue until the passages are completely closed.

7. A valve as defined in claim 6, wherein said resilient valve member comprises a plurality of discs stacked together in juxtaposed relation, each of said discs having a plurality of openings therethrough, said openings through said discs being in respective registration to define said passages through said resilient valve member, and said discs progressively increasing in hardness along the direction of fluid flow.

8. A valve comprising: a housing having an inlet and an outlet, a resilient valve member having a relatively large number of axially aligned passages therethrough for flow of fluid from the inlet to the outlet of the housing, said resilient valve member being received by said housing, and means for applying pressure to said resilient valve member in a direction parallel to said passages whereby operation of the pressure applying means causes a gradual restriction of the passages over their entire length which may continue until the passages are completely closed.

9. A valve as defined in claim 8, wherein said housing extends about the outer periphery of said resilient valve member, and said resilient valve member is disposed in radially inwardly spaced relation to said housing when in an unstressed condition.

10. A valve as defined in claim 9, wherein the number of passages through said resilient valve member is of the order of from 150 to 250.

11. A valve comprising: a substantially cylindrical housing having an inlet and outlet at its opposite ends, a substantially cylindrical resilient valve member having a multiplicity of substantially axially aligned passages therethrough for flow of fluid from the housing inlet to the outlet, said resilient valve member being received by said housing in radially inwardly spaced relation thereto, a valve seat plate received within said housing at the outlet and thereof and fixedly attached thereto, said valve seat plate having a plurality of perforations therethrough in respective axial registration with the passages through said resilient valve member, a gland plate slidably received by said housing and having a plurality of perforations therethrough in respective axial registration with the passages through said resilient valve member, said resilient valve member being interposed between said valve seat plate and said gland plate, a pressure cylinder disposed upstream from said gland plate within said housing, a piston slidably mounted in said pressure cylinder for reciprocatory movement therein, said piston having a piston rod extending through one end wall of said pressure cylinder in juxtaposition to said gland plate, and means to admit fluid pressure into said pressure cylinder for forcing said piston in a direction toward said gland plate so that said piston rod urges said gland plate in a direction toward said resilient valve member to deform said resilient valve member for causing a gradual restriction of the passages therethrough over the entire length of such passages which may continue until such passages are completely closed.

12. A valve as defined in claim 11, wherein at least one of said valve seat plate and said gland plate is secured to said resilient valve member.

13. A valve as defined in claim 11, wherein said pressure cylinder is disposed at the inlet end of said housing and is provided with a plurality of circumferentially spaced axially extending passages therethrough defining the inlet to said housing, and fluid diverting means comprising the other end wall of said pressure cylinder for directing a fluid stream in a radially outward direction toward said circumferentially spaced axially extending passages through said pressure cylinder.

14. A valve comprising: a substantially cylindrical housing having an inlet and outlet, a substantially cylindrical resilient valve member having a plurality of substantially axially aligned passages therethrough for flow of fluid from the housing inlet to the outlet and slidably received by the housing; said resilient valve member comprising a plurality of discs stacked together in juxtaposed relation, each of said discs having a plurality of openings therethrough, the openings through said discs being in respective registration to define said axially aligned passages through said resilient valve member, and said discs progressively increasing in hardness along the direction of fluid flow; a valve seat received within said housing and fixedly attached thereto, said valve seat having a plurality of passages therethrough contiguously formed with the passages through said resilient valve member, a gland member slidably received by said housing and having a plurality of passages therethrough contiguously formed with the passages through said resilient valve member, said resilient valve member being interposed between said valve seat and said gland member, and means for moving said gland member in a direction toward said resilient valve member to deform said resilient valve member for causing a gradual restriction of the passages therethrough over the entire length of such passages which may continue until such passages are completely closed.

References Cited by the Examiner

UNITED STATES PATENTS

| | | | |
|---|---|---|---|
| 965,684 | 7/1910 | Bierce et al. | 174—77 X |
| 1,851,940 | 3/1932 | Williams | 174—23 |
| 2,261,531 | 11/1941 | Thomas | 251—4 X |
| 2,454,979 | 11/1948 | Snell et al. | 251—205 X |
| 2,917,269 | 12/1959 | Welker | 138—46 X |
| 2,927,765 | 3/1960 | Morris | 251—4 |
| 2,941,544 | 6/1960 | Piras | 137—517 X |
| 3,055,972 | 9/1962 | Peterson | 277—9 X |

FOREIGN PATENTS

| | | |
|---|---|---|
| 222,794 | 10/1924 | Great Britain. |
| 502,094 | 3/1939 | Great Britain. |

M. CARY NELSON, *Primary Examiner.*

A. ROSENTHAL, *Assistant Examiner.*